Oct. 21, 1924.

T. C. RUSSELL 1,512,366

ELECTRIC HEATING DEVICE

Filed April 7, 1922

Inventor,
Thomas C. Russell
By Charles J. Schmidt
Atty.

Patented Oct. 21, 1924.

1,512,366

UNITED STATES PATENT OFFICE.

THOMAS C. RUSSELL, OF CHICAGO, ILLINOIS.

ELECTRIC HEATING DEVICE.

Application filed April 7, 1922. Serial No. 550,335.

*To all whom it may concern:*

Be it known that I, THOMAS C. RUSSELL, a citizen of the United States, and a resident of Chicago, in the county of Cook and State of Illinois, have invented certain new and useful Improvements in Electric Heating Devices, of which the following is a specification.

My invention relates to electric heating devices and covers improved arrangement and securing of the resistance or heating wires. The object of the invention is to build up a compact, simple and efficient heating unit which can be applied intimately to the surface of devices to be heated as for example flat irons, waffle irons, cooking utensils, etc.

In accordance with my invention the resistance member in the form of a fine wire is preferably bent in zigzag fashion and then laid flat and arranged on a supporting member such as a sheet of mica. To hold the resistance member in proper arrangement on the sheet and so that its adjacent sections or loops do not touch, I use fastening devices in the form of staples which can be readily applied to the sheet at desired points to receive the resistance member and hold it flat and in place.

The above and other features of my invention are incorporated in the structure shown on the accompanying drawing, in which—

Figure 1:
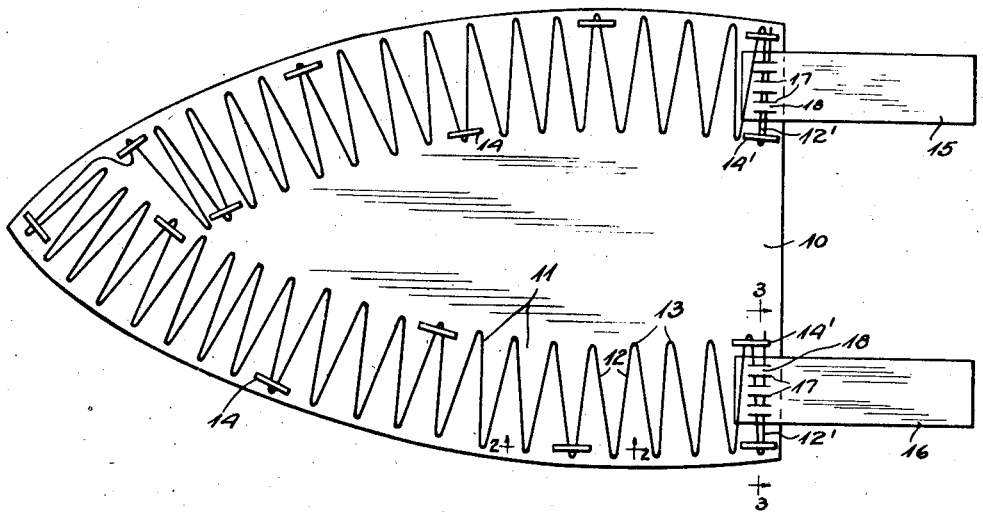
Fig. 1 is a plan view of a heating unit.
Figure 2:
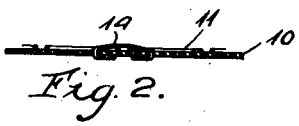
Fig. 2 is an enlarged sectional view on plane 2—2 Fig. 1.
Figure 3:
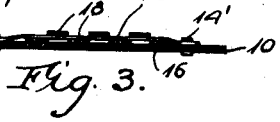
Fig. 3 is an enlarged sectional view on plane 3—3 Fig. 1.

The heating element shown in Fig. 1 is designed for use in a flat iron. A sheet 10 of mica or other suitable material is cut to the desired shape and the resistance or heating member 11 is arranged and secured thereon. The heating member can be arranged on the sheet as desired to give the proper resistance length of wire. As shown the heating member is formed by folding a length of wire back and forth in zigzag fashion to form adjacent sections 12 connected by loops or bends 13. This heating member is then applied on the sheet in any arrangement desired. As shown it parallels the sides of the sheet. To secure the heating member in place and to cause it to lie flatly against the sheet I preferably utilize fastening members 14 in the form of staples. These staples can be readily applied by means of a suitable machine at desired points to bridge over the wire and hold it against the plate. The staples may be applied across the loops 13 of the resistance member as shown. The staple members which are originally of inverted U shape are applied through the supporting sheet with their yokes bridging the wire, the legs of the staples being then clinched or turned over against the bottom of the sheet as clearly shown in Fig. 2.

Terminals 15 and 16 are provided for the heating element and are connected with the ends thereof in such manner as to give good electrical connection. The terminals shown are in the form of sheet metal strips and at one end each has a transverse row of longitudinally extending slits 17, alternate sections 18 formed by the slits being deflected in opposite directions to form a passageway through which are inserted one or more of the wire sections 12' at the end of the heating element. After insertion of the wire sections the terminal sections 18 are subjected to pressure to securely clamp the wire sections and to make good electrical contact therewith. To secure the terminals to the sheet 10 staples 14' are applied to the ends of the wire sections 12' which extend through the terminals.

Figure 4:
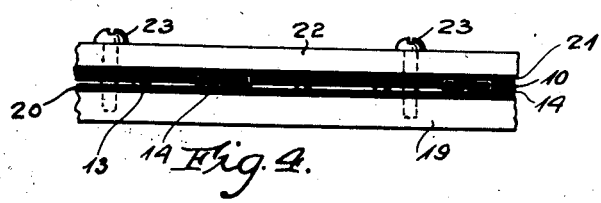
Fig. 4 is a fragmentary view illustrating the application of the heating unit to a device to be heated.

In Fig. 4 I have shown a heating unit applied to heat a member 19 which may be the base of a flat iron. On the base is first placed a layer or sheet 20 of mica or other suitable insulating material. On this is laid the inverted heating unit over which is then applied a layer or blanket 21 of mica, asbestos or other electrical insulating and heat resisting material. On top of the layer 21 is applied the pressure plate 22 which by means of screws 23 is drawn toward the base 19 to securely clamp the heating unit and insulating layers together and to bring the heating element as close as possible to the base so that the generated heat is efficiently utilized to heat the plate, the heating element being separated from the base only by the thin layer 20.

The heating member may be arranged in conical figure as shown or it may be arranged in circular, rectangular, spiral or other figures depending upon the shape and nature of the device to be heated. Several heating units could also be arranged one on top of the other with insulating plates between and the several heating elements electrically connected together. A heating structure of the desired capacity can thus be readily built up.

I thus produce a very simple and efficient heating unit, and simple, efficient and inexpensive means for securing the heating element on its upper plate so that the unit can then be readily handled and assembled without danger of contact and short circuiting of adjacent sections of the folded wire. The heating member terminals are also secured in a simple and efficient manner and maintain good electrical contact with the element.

Having described my invention, I claim as follows:

1. In a heating unit of the class described, the combination of an insulating supporting sheet, a resistance member supported on said sheet, terminals for said resistance member, the ends of said terminal being slitted and the ends of said resistance member being inserted through said slits to be electrically connected with said terminals.

2. In a heating unit of the class described, the combination of an insulating supporting sheet, a resistance element supported thereon, terminals for said element, said terminals being slitted and the heating element ends being inserted through the slits to be electrically connected with the terminals, and securing means engaging the heating element ends adjacent said terminals for securing said terminals to the sheet.

3. In a heating unit, the combination of a supporting sheet, a heating wire secured on said sheet, terminals for said wire, said terminals being of sheet metal and slitted and alternate sections formed by said slits being deflected in opposite directions to form a passageway, the ends of said wire being inserted in said passageways to be electrically connected with said terminals, and means securing said terminals to said sheet.

In witness whereof, I hereunto subscribe my name this 4th day of April A. D., 1922.

THOMAS C. RUSSELL.